United States Patent
Watanabe

(10) Patent No.: US 8,711,403 B2
(45) Date of Patent: Apr. 29, 2014

(54) PRINTER DRIVER, PRINTER CONTROL METHOD, AND RECORDING MEDIUM

(75) Inventor: Michiaki Watanabe, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 651 days.

(21) Appl. No.: 12/911,636

(22) Filed: Oct. 25, 2010

(65) Prior Publication Data

US 2011/0102838 A1 May 5, 2011

(30) Foreign Application Priority Data

Oct. 29, 2009 (JP) ................................. 2009-249444

(51) Int. Cl.
*G06F 15/00* (2006.01)

(52) U.S. Cl.
USPC .......... 358/1.15; 358/1.9; 358/1.13; 358/468; 710/72; 370/394

(58) Field of Classification Search
None
See application file for complete search history.

(56) References Cited

U.S. PATENT DOCUMENTS

| | | | |
|---|---|---|---|
| 5,628,030 A * | 5/1997 | Tuckner | 710/64 |
| 6,240,472 B1 * | 5/2001 | Hu | 710/72 |
| 6,369,906 B1 | 4/2002 | Nakao | |
| 6,965,955 B1 * | 11/2005 | Nishiyama | 710/72 |
| 7,265,857 B1 | 9/2007 | Murata | |
| 8,228,531 B2 * | 7/2012 | Kanamori | 358/1.15 |

FOREIGN PATENT DOCUMENTS

| | | |
|---|---|---|
| EP | 1710682 A2 | 10/2006 |
| JP | 08-147118 | 6/1996 |
| JP | 09-152946 | 6/1997 |
| JP | 2001-154816 | 6/2001 |
| JP | 2007-072711 | 3/2007 |

* cited by examiner

*Primary Examiner* — Ashish K Thomas

(57) ABSTRACT

A printer driver, printer control method, and printer control program can prevent a printer from operating in unintended ways even when an old version of an application that is not multi-application capable is executed through a new version of a dedicated driver that is multi-application capable. A printer driver 20 has a dedicated driver 22 that can switch operation between a plurality of dedicated applications 27 and 28 by means of occupy requests and release requests. The occupy requests and release requests are requests that are received from the dedicated applications 27 and 28 to occupy or release a POS printer 30. When a request to start using the POS printer 30 is received from the dedicated application 27 the dedicated driver 22 tells the communication module 25 that the POS printer 30 is occupied by the dedicated application 27 and sets the POS printer 30 to an occupied status.

4 Claims, 6 Drawing Sheets

PRINTER DRIVER, PRINTER CONTROL METHOD, AND RECORDING MEDIUM

CROSS-REFERENCE TO RELATED APPLICATION

This application claims priority under 35 U.S.C. §119 to Japanese Patent Application No. 2009-249444 filed on Oct. 29, 2009, the entire disclosure of which is expressly incorporated by reference herein.

BACKGROUND

1. Technical Field

The present invention relates to a printer driver, to a printer control method, and to a recording medium.

2. Related Art

Application programming interfaces (API) are commonly used to simplify writing application programs. The API provides functions that can be used by all programs, and individual applications can execute various operations using the provided functions by simply calling the API.

Japanese Unexamined Patent Appl. Pub. JP-A-2001-154816 teaches technology enabling a host computer that is communicably connected to a printer to get printer status information, and the print data generating module of a printer driver connected to the host computer to generate a print image containing the status information by using the API.

Japanese Unexamined Patent Appl. Pub. JP-A-2007-72711 teaches technology enabling a print spooler monitoring application and a status monitoring application that run on the operating system (OS) of a client PC to use an API to monitor the status of the spooler and changes in the printer status.

Applications that provide a variety of functions by using an API can thus be easily developed. Dedicated drivers that include an API specific for a particular device in order to simplify development of device-specific applications are also known.

An example of such a device is a POS printer that is used in POS (point of sale) systems. When a general purpose driver that is used with Windows (R) is installed to a host computer that uses Windows (R) as the operating system, the status information that can be acquired from the POS printer is limited. The information that can be acquired from the printer is determined by the general purpose driver, and other information cannot be obtained. Therefore, in order to fully utilize the functions that are provided by the POS printer, a dedicated driver including a dedicated API enabling most of the functions of the POS printer to be used is required, and the POS printer is used through this dedicated driver.

These dedicated drivers are provided by the device manufacturer, such as the POS printer manufacturer. Applications that use such devices (the POS printer in this example) are typically developed by, for example, the supplier of the POS system or other such user-side device buyer using the dedicated driver. As a result, insofar as there are no particular problems with the application itself, the printer will operate normally when the user-developed application is executed by calling the dedicated driver provided by the POS printer manufacturer.

However, device developers often update their dedicated drivers with new functions and provide the upgraded versions to users. Furthermore, because new versions of a dedicated driver also support the functions provided by older versions of the dedicated driver, applications that were developed for compatibility with an older version of the dedicated driver should also be able to use new versions of the driver. However, if the dedicated driver and the application are different versions, the printer may operate in unexpected ways.

For example, so that a plurality of applications can share a single printer, new dedicated drivers that provide an API providing multi-application capability and a communication module enabling communication with multiple applications have been developed. User-developed applications that continue to use older versions of the dedicated driver providing a conventional API that is is not multi-application capable are obviously old versions that are also lacking multi-application capability. If the old version of the application is executed through the new version of the dedicated driver, unintended operations may occur in parts that are, for example, related to controlling printer access for multi-application capability and are therefore not found in the old version, such as receiving other processes that are not related to the printer. This problem occurs when, for example, a new version of a dedicated driver is released and then installed in a system that uses an old version of the application and an old version of the dedicated driver.

SUMMARY

A printer driver, a printer control method, and a recording medium storing a printer control program according to at least of one embodiment of the present invention prevent a printer from operating unexpectedly even when an old version of an application that is not compatible with multi-application capability is executed using a new version of a dedicated driver with multi-application capability.

A first aspect of the invention is a printer driver adapted to be installed on a computer, the printer driver including a communication module that controls communication with a printer; and a state management unit that, when there is a plurality of applications, can switch the application setting the printer to the occupied state in the communication module based on an occupy request or a release request received from one of the plural applications, the occupy request being a request to occupy the printer and the release request being a request to release the printer from being occupied, and when an occupy request has not been received from an application and a start use request for the printer is received from an application, tells the communication module that the printer is occupied by the application and sets the printer to an occupied state in the communication module.

When a start use request for the printer is received from an application, this aspect of the invention tells the communication module that the printer is occupied even if an occupy request has not been received from an application. That is, the printer can be set to an occupied (busy) state whether a start use request is received from an old version or a new version of an application. Therefore, even if the printer driver is a new version that can change the application occupying the printer in the communication module by means of an occupy request or a release request, the printer can first be set to the occupied state without the printer being set to the shared status in the communication module when a start use request is received from an old version of an application that is incompatible with multi-application capability and does not assert occupy requests or release requests. As a result, even if an old version of an application is used together with a new version of a dedicated driver that is multi-application capable, operations that are not expected on the application side can be prevented because the printer is not set to a shared mode in the communication module. The printer driver can also be made compatible with both old and new versions of an application.

In another aspect of the invention, when a start use request is received from another application while the printer is already occupied in the communication module by an application, the state management unit cancels the occupied status, informs the communication module that the printer is shared by a plurality of applications, and sets the printer to a shared state in the communication module.

If the printer is occupied in the communication module by one application and a start use request is received from another application, plural applications are running. In addition, execution of plural applications means can be interpreted to mean that all of the applications are new application versions that are multi-application capable. Therefore, even if the occupied state is canceled and the printer is shared, operations that are unexpected by the application will not be executed. In addition, the printer can be operated by switching between applications using the occupy requests and release requests that are asserted by new versions of the printer driver.

Yet further preferably in another aspect of the invention, when an occupy request or a release request is received from the application, the state management unit reports printer sharing to the communication module, and sets the printer to a shared state in the communication module.

In this aspect of the invention receiving an occupy request or release request from an application means that the application should be a new version with multi-application capability. As a result, operations unexpected by the application will not execute even if sharing is enabled.

In another aspect of the invention, when the communication module continues to wait for print data from the application after the printer is set to the occupied state in the communication module, the state management unit sends specific dummy data to the communication module to cancel the waiting state in the communication module.

If after the application sets the printer to the occupied state in the communication module the communication module or printer continues to wait for print data for a certain period of time and the printer is not released, other applications cannot execute other printing processes. In this situation, this aspect of the invention sends null data or other dummy data to cancel the wait state and release the printer so that other applications can use the printer.

Another aspect of the invention is a computer-readable recording medium that stores the printer driver described above on semiconductor memory, a hard disk drive, optical disc media, or magnetic disk media, for example. The recording medium also includes semiconductor memory, hard disk drives, and other storage devices on which the printer driver is installed in a computer.

Another aspect of the invention is a control method for a printer that can operate the printer and, when there is a plurality of applications, can change the application setting the printer to the occupied state based on an occupy request or a release request received from one of the plural applications, the occupy request being a request to occupy the printer and the release request being a request to release the printer from being occupied, the control method including a step of setting the printer to an occupied state based on the application when an occupy request has not been received from an application and a start use request for the printer is received from an application.

Further preferably, when a start use request is received from another application while the printer is already occupied by an application, the occupied status is canceled and printer sharing by the plurality of applications is enabled. Further preferably, when an occupy request or a release request is received from the application, the printer is set to a shared state.

Further preferably, when waiting for print data from the application continues when set to the occupied state, specific dummy data is generated and the wait state is cancelled.

Another aspect of the invention is a recording medium recording a control program for a printer that can operate the printer and, when there is a plurality of applications, can change the application setting the printer to the occupied state based on an occupy request or a release request received from one of the plural applications, the occupy request being a request to occupy the printer and the release request being a request to release the printer from being occupied, the control program including: a step of receiving a start use request for the printer from an application even if an occupy request has not been received from an application; and a step of setting the printer to an occupied state based on the application.

Even if the printer driver is a new version that can switch between plural applications to operate the printer based on occupy requests and release requests, this aspect of the invention can first set the printer to the occupied state when a start use request is received from an old version of an application without sharing the printer. Therefore, even if an old version of an application is run through a new version of a dedicated driver that is multi-application capable, operations that are not intended by the application can be prevented from happening. Compatibility with both old and new versions of an application can also be maintained.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a printer driver, a printer control method, and a recording medium according to the invention are described below with reference to the accompanying figures.

Figure 1:
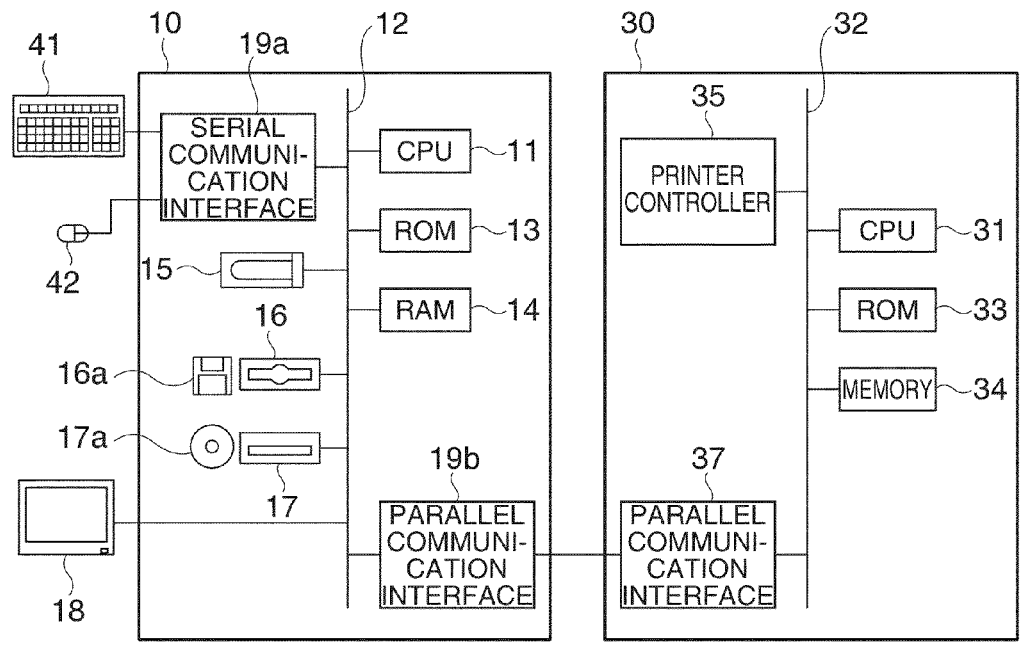
FIG. 1 is a block diagram showing the hardware configuration of a system including a printer and a host computer.

The hardware configuration of a host computer and printer is described below with reference to FIG. 1. The host computer 10 has a CPU 11 that controls operating processes, and the CPU 11 can access RAM 14 and ROM 13 in which the BIOS is stored through a system bus 12. Also connected to the system bus 12 are a hard disk drive 15 as an external storage device, a flexible disk drive 16, and a CD-ROM drive 17. The operating system (OS) and applications stored on the hard disk drive 15 are transferred to RAM 14, and the CPU 11 executes the software by appropriately accessing ROM 13 and RAM 14.

Connected to a serial communication interface 19*a* are user input devices such as a keyboard 41 and mouse 42 and a display device 18 through a video board not shown. A POS printer 30 used as an example of a printer can also be parallel connected through a parallel communication interface 19b.

Note that the configuration of this host computer 10 as an example of a computer is described briefly here, and a device having the configuration of a common personal computer may be used.

The POS printer 30 is a printer that is used in a POS system, and is used for printing receipts, for example. The POS printer 30 has a CPU 31 that controls processing operations, and the CPU 31 can access ROM 33 and memory 34 through a system bus 32. The memory 34 includes status information memory for storing status information, and buffer memory for storing print data. The status information memory may be rendered using RAM or EEPROM, for example. Also connected to the system bus 32 are a printer controller 35 that controls the print drive mechanism of the POS printer 30, and a parallel communication interface 37. The CPU 31 in this configuration executes firmware while accessing the ROM 33 and memory 34 as needed.

The CPU 31 controls the printer controller 35 based on print data stored in memory 34 to acquire and save status information or print receipts, for example. The POS printer 30 status information is sent to the host computer 10 through the parallel communication interface 37 and the parallel communication interface 19b of the host computer 10.

Figure 2:
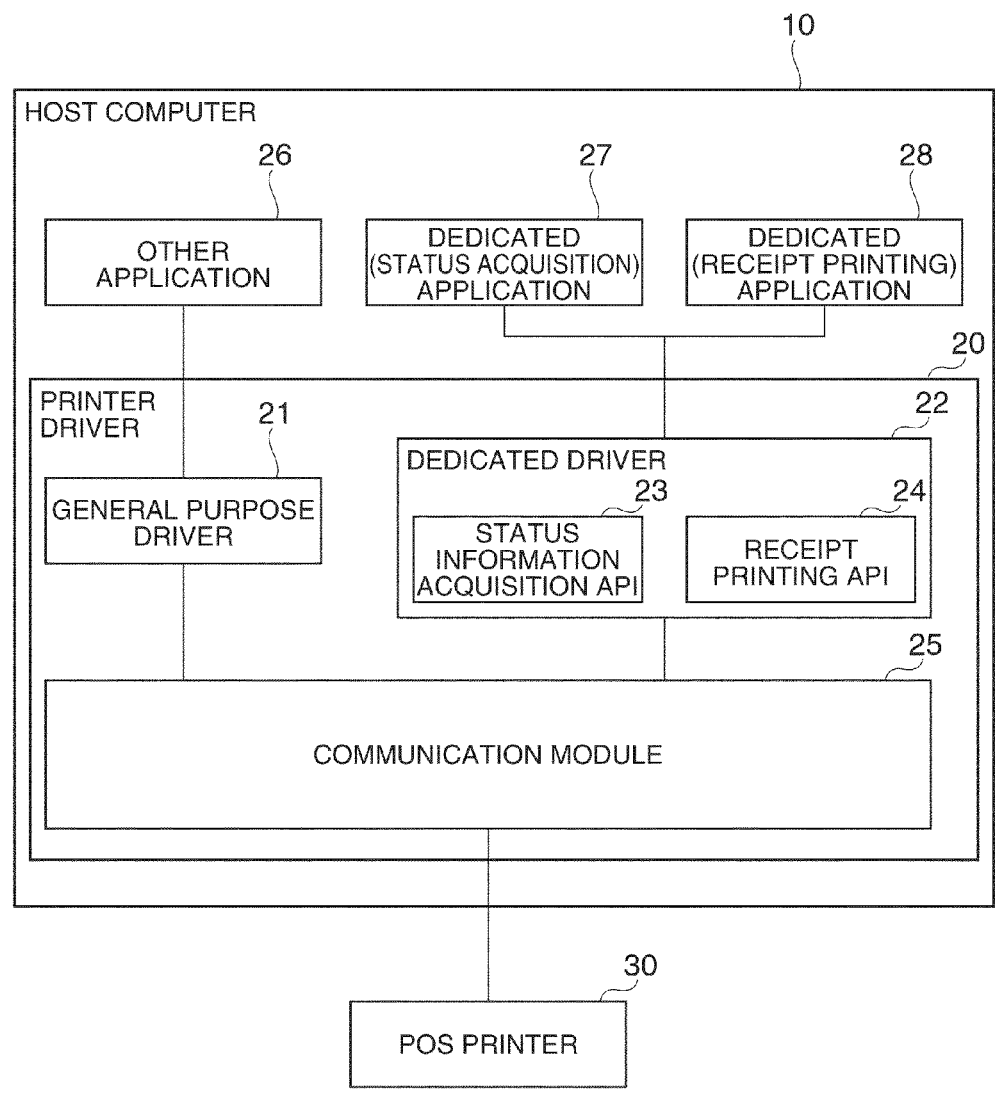
FIG. 2 shows the software structure of the host computer.

The software configuration of the host computer according to this embodiment of the invention is described next with reference to FIG. 2. The CPU 11 executes programs stored on the hard disk drive 15 under the operating system. In this embodiment of the invention the applications 26, 27, and 28 and printer driver 20 are stored on the hard disk drive 15 and executed by the CPU 11. The printer driver 20 in this embodiment of the invention includes a general purpose driver 21, a dedicated driver 22, and a communication module 25 as shown in FIG. 2.

When Windows (R) is used as the operating system of the host computer 10, for example, the general purpose driver 21 is a driver that is written to conform to the Windows (R) standard. The general purpose driver 21 converts data acquired from another application 26 to data that can be processed by the POS printer 30. However, the functions of this general purpose driver 21 are limited to those allowed by the standard.

The dedicated driver 22 (state management unit) is a dedicated driver for the POS printer 30. The dedicated driver 22 is provided by the printer manufacturer, for example, and covers all of the functions of the corresponding printer, such as acquiring POS printer 30 status information that cannot be acquired by the general purpose driver 21. More specifically, when the status acquisition application 27, which is an application specifically for the POS printer, executes, the status information acquisition API 23 of the dedicated driver 22 is called.

The status information acquisition API 23 monitors the status of the POS printer 30, and receives the printer status from the POS printer 30 through the communication module 25. The received status information is sent to the status acquisition application 27 in response to a get status request from the status acquisition application 27. Printer status information that is unique to the POS printer 30, such as errors reporting a paper jam in the automatic paper cutter, can also be received.

The dedicated driver 22 control the receipt printing process of the POS printer 30. When the receipt printing application 28, which is a dedicated application for the POS printer, executes, the receipt printing API 24 of the dedicated driver 22 is called. The receipt printing API 24 converts print data received from the receipt printing application 28 to a format that can be processed by the POS printer 30, and outputs to the POS printer 30 through the communication module. An automatic cutter command, which is an example of a command specific to the POS printer 30, can be sent at this time to cut the paper and issue the printout as a receipt.

The dedicated driver 22 according to this embodiment of the invention thus invokes the API according to calls from dedicated applications 27 and 28. In order to call the API, the dedicated applications 27 and 28 must first send start use request for the POS printer 30 to the dedicated driver 22.

The dedicated driver 22 enables sharing the POS printer 30 between a plurality of dedicated applications. For example, the receipt printing application 28 can be started while the status acquisition application 27 is running, and the status acquisition application 27 can be started while the receipt printing application 28 is running. The dedicated driver 22 receives from the dedicated applications 27 and 28.

By asserting occupy requests to access and control the POS printer 30 and release requests to relinquish control of the POS printer 30 to switch between the status acquisition application 27 and the receipt printing application 28, the dedicated driver 22 can temporarily occupy and control POS printer 30 operation. More specifically, a plurality of dedicated applications can use the POS printer 30 on a time-share basis.

Figure 3:
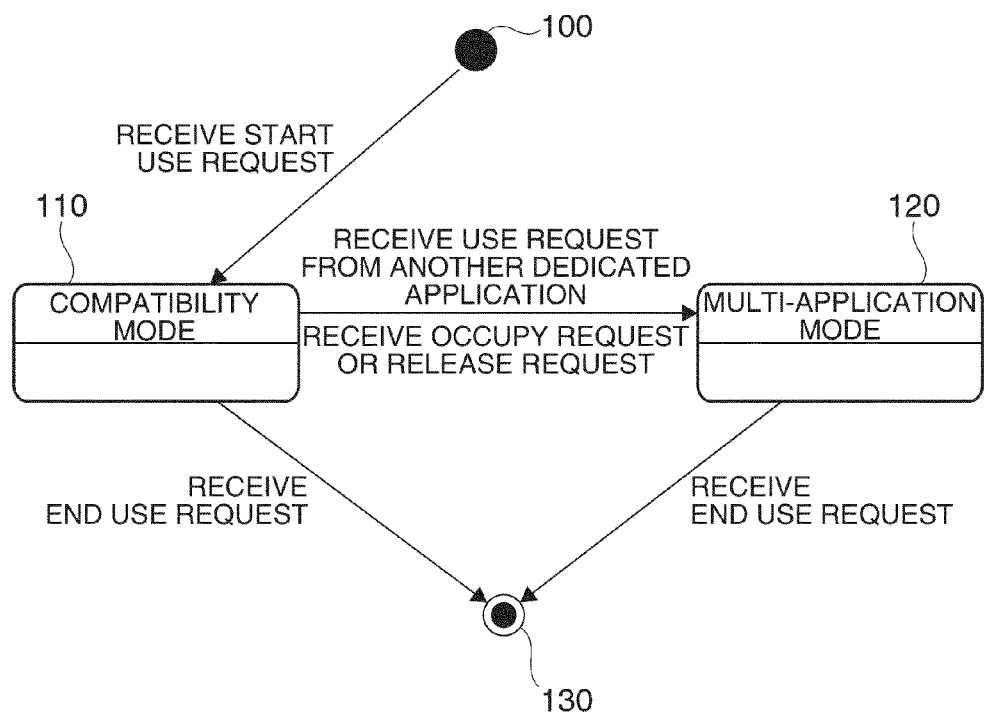
FIG. 3 shows the state transitions of a dedicated driver.

When the first start use request is received from either of the dedicated applications 27 and 28, the dedicated driver 22 tells the communication module 25 that the POS printer 30 is occupied, and automatically sets the POS printer 30 status to busy either in or through the communication module 25. That is, as shown in FIG. 3, when a first start use request is received from either dedicated application 27 or 28, the dedicated driver 22 goes from the starting point 100 in the standby mode to the compatibility mode 110. The compatibility mode 110 is also compatible with old application versions.

If the POS printer 30 is occupied by one dedicated application 27 (or 28) and a start use request is asserted by the other dedicated application 28 (or 27), the POS printer 30 is automatically released from the occupied (busy) state after a specific process executes. Sharing the POS printer 30 by the plural dedicated applications 27 and 28 is also reported to the communication module 25, and the POS printer 30 is set to the shared status either in or through the communication module 25. More specifically, as shown in FIG. 3, the dedicated driver 22 goes to the multi-application mode 120 when a start use request is received from another dedicated application 28 (or 27) while in the compatibility mode 110. The multi-application mode 120 is compatible with new application versions. This is because if a start use request is received from another dedicated application 28 (or 27), that application can be considered to be a new version that is multi-application capable.

When an occupy request or release request is received from a dedicated application 27 (or 28), the dedicated driver 22 reports sharing the POS printer 30 to the communication module 25, and the POS printer 30 is set to the shared state in or through the communication module 25. More specifically, as shown in FIG. 3, the dedicated driver 22 also goes to the multi-application mode 120 when the foregoing occupy request or release request is received from the dedicated application 28 (or 27) in the compatibility mode 110.

When a stop use request is received from the dedicated application 27 (or 28), the dedicated driver 22 stops use of the printer by the dedicated application 27 (or 28). More specifically, as shown in FIG. 3, the dedicated driver 22 goes to the end point 130 when a stop use request is received from the dedicated application 27 (or 28) in the compatibility mode 110 or the multi-application mode 120.

If the dedicated driver 22 determines that the communication module 25 or POS printer 30 has waited to receive the print data or other data for a specified time after reporting sharing the POS printer 30 to the communication module 25, the dedicated driver 22 sends dummy data indicating that data was received even though no POS printer operations have executed to the communication module 25, and releases the communication module 25 or POS printer 30 from the data reception standby mode. For example, the communication module 25 or POS printer 30 may wait to receive all of a particular amount of bitmapped data. Bitmap data tends to be large, and if a time-consuming problem occurs on the transmission side, the POS printer 30 will simply continue waiting and cannot be used by other applications. In this situation, an amount of null data equal to the remaining bitmap data is transmitted unconditionally to release the device from waiting.

The dedicated driver 22 thus first goes to the compatibility mode 110 when a start use request is received from a dedicated application, and goes to the multi-application mode 120 when a start use request, occupy request, or release request is subsequently received from another dedicated application. However, after once entering the multi-application mode 120, the dedicated driver 22 does not return to the compatibility mode 110. This is because the applications installed on the host computer 10 can be determined to be new application versions that assert occupy requests and release requests.

The flow of the processes in which the dedicated driver 22 shifts to the compatibility mode 110 or the multi-application mode 120 are described next with reference to FIG. 4 to FIG. 6.

Entering the Compatibility Mode

Figure 4:
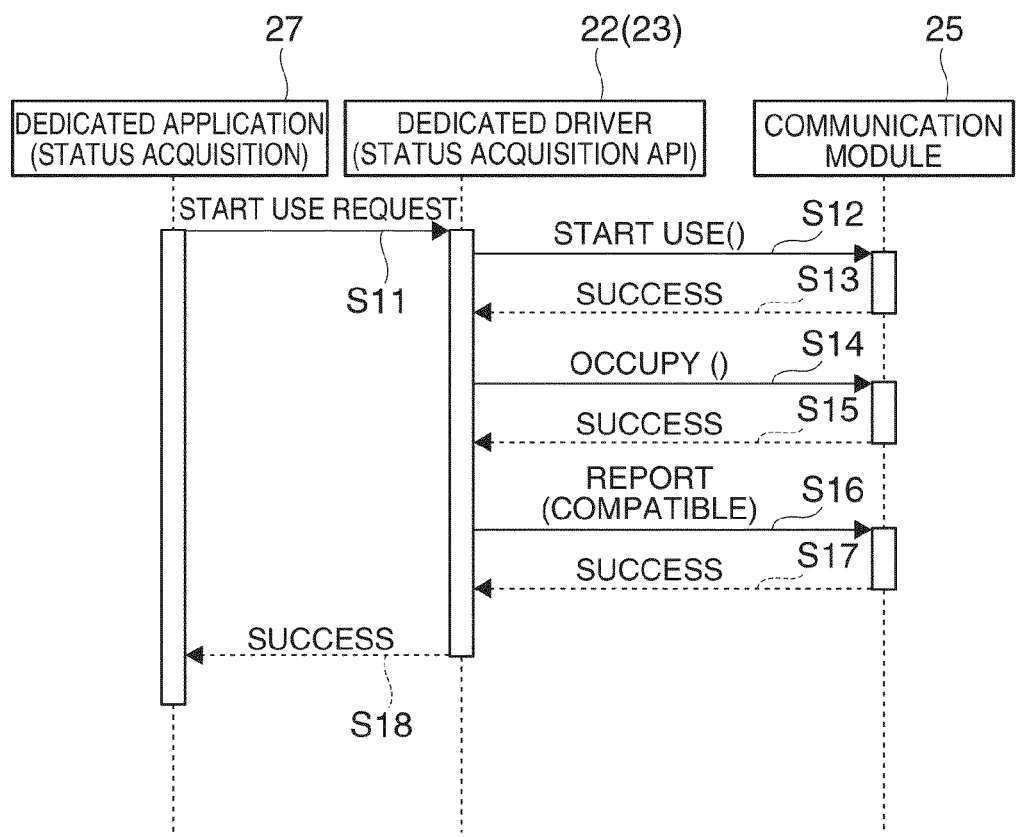
FIG. 4 describes a process executed by the dedicated driver when a start use request is received from an application.

FIG. 4 shows the flow of the process for entering the compatibility mode 110.

A POS application, for example, running on the host computer 10 starts the status acquisition application 27 to get the POS printer 30 status information. The status acquisition application 27 sends a start use request to the dedicated driver 22 (step S11).

When the status information acquisition API 23 is called, the status information acquisition API 23 reports the start of use to the communication module 25 (step S12), and if the printer is usable the communication module 25 returns a success response to the status information acquisition API 23 (step S13). The status information acquisition API 23 then sends an occupy report to the communication module 25 (step S14), and if the printer can be occupied, the communication module 25 returns a success report to the status information acquisition API 23 (step S15). The status information acquisition API 23 then reports operating in the compatibility mode 110 to the communication module 25 (step S16), and if operation in the compatibility mode 110 is possible the communication module 25 returns a success report to the status information acquisition API 23 (step S17). The status information acquisition API 23 then determines the communication module 25 is usable and sends a success report to the status acquisition application 27 (step S18).

As thus described, the compatibility mode 110 can be enabled when a start use request is first received from a dedicated application. That is, even if an occupy request is not received from the dedicated application 27, the status information acquisition API 23 can automatically set the status of a new version of the communication module 25 to occupied (busy), or can set the status of the POS printer 30 to occupied (busy) through a new version of the communication module 25, as a result of simply receiving a start use request. Therefore, even if the dedicated application 27 is an old version of the application that is not compatible with a new version of the application that can switch the status of the communication module 25 or the status of the POS printer 30 through the communication module 25 by asserting an occupy request or release request, the communication module 25 can be occupied or the POS printer 30 can be occupied through the communication module 25 by first entering the compatibility mode 110. As a result, because the busy status of the communication module 25 or POS printer 30 can be sustained without sharing the POS printer 30 on a time-division basis when the status acquisition application 27 is an old version of the application that cannot share the communication module 25 or POS printer 30 with a plurality of dedicated applications, an old version of the dedicated application can be prevented from erroneously causing the POS printer 30 to operate unexpectedly as a result of shared control by a dedicated driver 22 (23). For example, if the dedicated driver 22 (23) sends information relating to a shared mode request or response to an old version of the dedicated application, the old version of the dedicated application may mistakenly determine it to be information requiring a response to the POS printer 30, therefore send response information to the POS printer 30 even though it is not needed, and the POS printer 30 may print in error.

Entering the Multi-Application Mode

Figure 5:
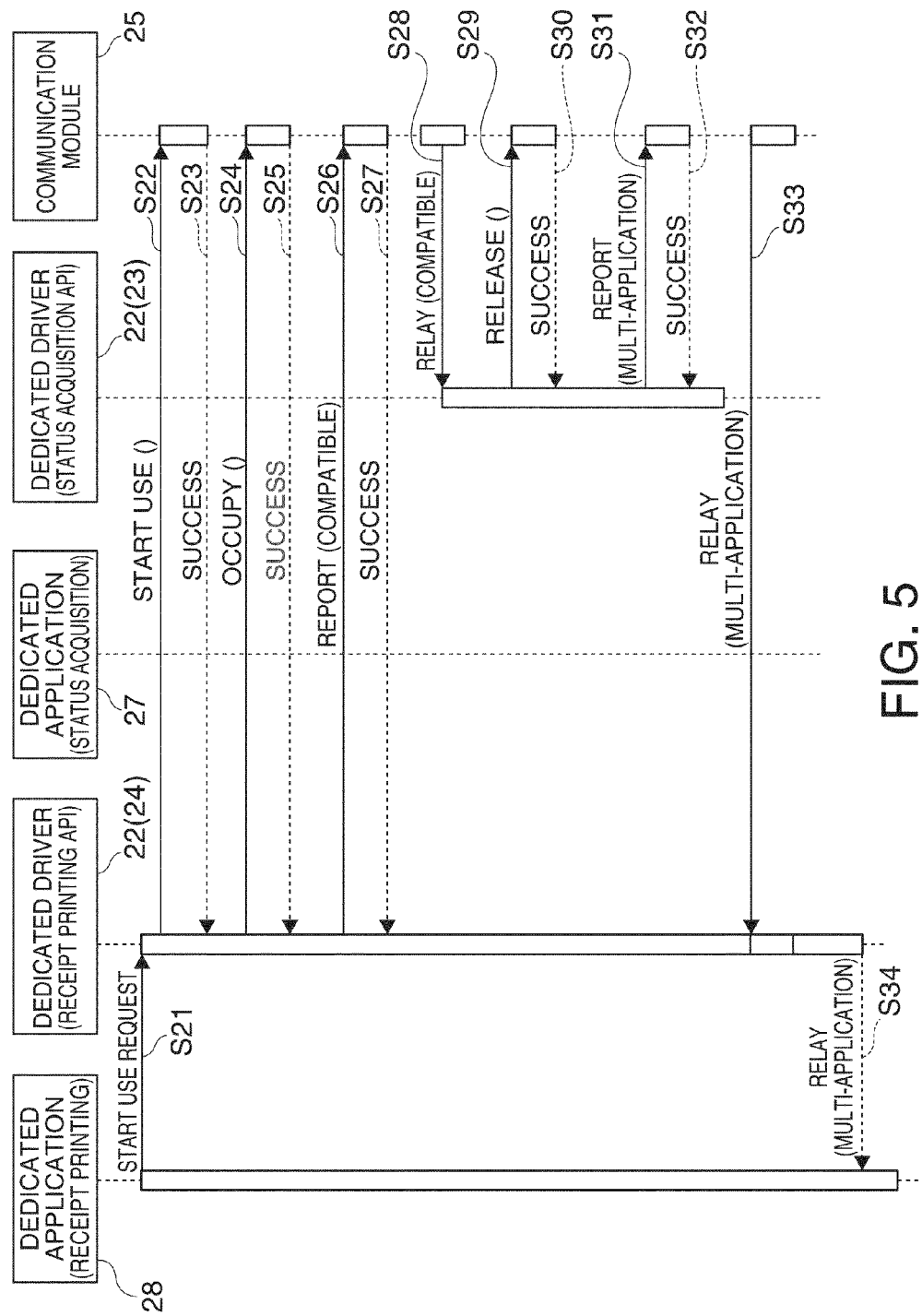
FIG. 5 describes a process executed by the dedicated driver when a start use request is received from another application.

FIG. 5 shows the flow of the process for going from the compatibility mode 110 entered in FIG. 4 to the multi-application mode 120.

The POS application on the host computer 10, for example, activates the receipt printing application 28 for printing receipts while the status acquisition application 27 is running. The receipt printing application 28 sends a start use request to the dedicated driver 22 (step S21).

When the receipt printing API 24 is called, the receipt printing API 24 sends a start use report to the communication module 25 (step S22), and if the printer is usable the communication module 25 returns a success report to the receipt printing API 24 (step S23). The receipt printing API 24 then sends an occupy request to the communication module 25 (step S24), but because the status information acquisition API 23 occupied the POS printer 30 in step S14 in FIG. 4, the communication module 25 returns a failure to the receipt printing API 24 (step S25). As in step S16 in FIG. 4, the receipt printing API 24 reports operating in the compatibility mode 110 to the communication module 25 (step S26), and if use in the compatibility mode 110 is possible the communication module 25 returns a success flag to the receipt printing API 24 (step S27).

In response to the report from the receipt printing API 24 in step S26, the communication module 25 tells the status information acquisition API 23 that the compatibility mode is enabled (step S28). In response to the compatibility mode response from the communication module 25, the status information acquisition API 23 then sends a release request to the communication module 25 to release the printer occupancy reported in step S14 in FIG. 4 (step S29). If the printer can be released, the communication module 25 sends a success flag to the status information acquisition API 23 (step S30).

The status information acquisition API 23 then tells the communication module 25 to change from the compatibility mode 110 to the multi-application mode 120 (step S31), and if the mode change is possible the communication module 25 returns a success flag to the status information acquisition API 23 (step S32).

In response to the multi-application mode request from the status information acquisition API 23, the communication module 25 passes the multi-application mode 120 request to the receipt printing API 24 (step S33). The receipt printing API 24 also reports entering the multi-application mode 120 to the receipt printing application 28 (step S34). As a result, both the status information acquisition API 23 and the receipt printing API 24 switch to the multi-application mode 120.

As described above, when the POS printer 30 is occupied by one dedicated application 23 and a start use request is asserted by another dedicated application 28, a plurality of dedicated applications 27 and 28 are executing. As a result, both dedicated applications 27 and 28 can be determined to be new multi-application capable versions of the dedicated applications. Therefore, even if the busy state set in step S14 is cancelled and the multi-application mode 120 is enabled, that is, even if the POS printer 30 is shared, the POS printer 30 will not execute unexpected operations because the applications are designed to share the POS printer 30. The POS printer 30 can therefore be shared on a time-division basis.

Other Processes Entering the Multi-Application Mode

Figure 6:
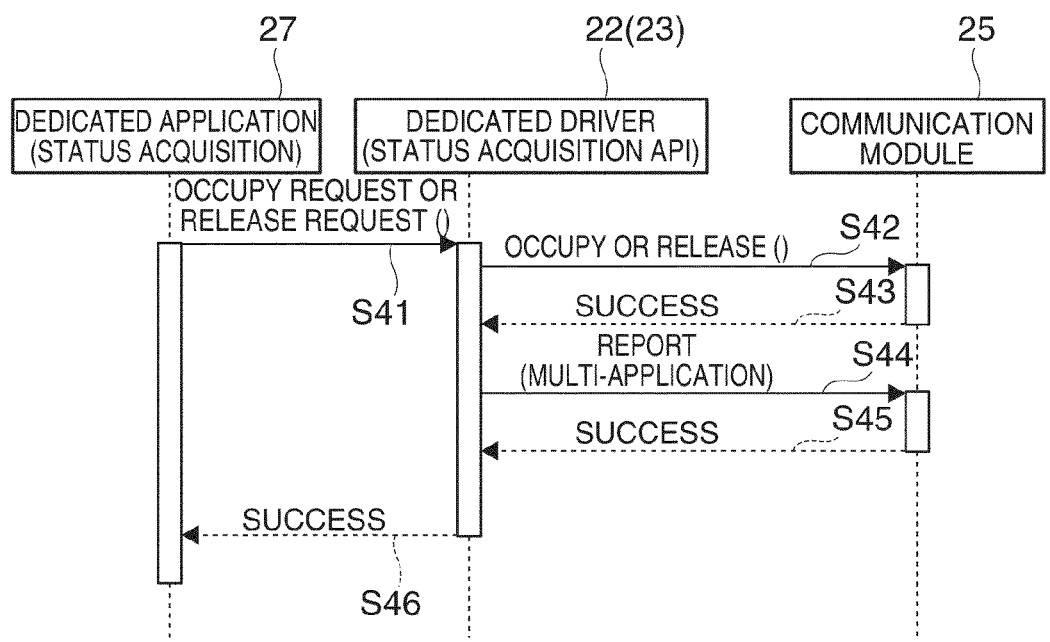
FIG. 6 describes a process executed by the dedicated driver when an occupy request or release request is received from an application.

The flow of another process that goes from the compatibility mode 110 set in FIG. 4 to the multi-application mode is shown in FIG. 6.

The status acquisition application 27 sends an occupy request to the dedicated driver 22 in order to temporarily use the POS printer 30 (step S41). When the status information acquisition API 23 is called, the status information acquisition API 23 sends the occupy request to the communication module 25 (step S42), and if usable the communication module 25 returns a success flag to the status information acquisition API 23 (step S43). The status information acquisition API 23 then tells the communication module 25 to shift from the compatibility mode 110 set in step S16 in FIG. 4 to the multi-application mode 120 (step S44). If the mode change is possible, the communication module 25 returns a success flag to the status information acquisition API 23 (step S45), and the status information acquisition API 23 then returns a success flag to the dedicated application 27 (step S46).

Note that for the status acquisition application 27 to temporarily release the POS printer 30, the status information acquisition API 23 similarly receives a release request from the status acquisition application 27 in step S41, sends a release request to the communication module 25 in step S42, and tells the communication module 25 to enter the multi-application mode 120 in step S44.

As thus described, that the status information acquisition API 23 receives an occupy request or a release request from a dedicated application 27 means that that dedicated application can be determined to be a new version that is multi-application capable. More specifically, each of the dedicated applications 27 and 28 should have been developed for compatibility with the new version of the dedicated driver 22, and the plural dedicated applications can take turns operating the communication module 25 or the POS printer 30 through the communication module 25 by temporarily occupying the POS printer 30 by asserting occupy requests or release requests. As a result, even if the multi-application mode 120 is enabled in step S44, that is, even if the POS printer 30 is shared, the POS printer 30 will not execute unexpected operations.

Note that in the embodiment described above the status information acquisition API 23 sends an occupy request to the communication module 25 in response to a start use request from the dedicated application 27 in FIG. 4, but the receipt printing API 24 can also send an occupy request to the communication module 25 in response to a start use request from the dedicated application 28.

In this example, the receipt printing API 24 sent an occupy request to the communication module 25 in step S14 in FIG. 4, and a command transmission API for sending commands sent bitmap data in blocks as the print data to the POS printer 30. If a system error, for example, occurs while the print data is being sent, the communication module 25 or POS printer 30 may continue to wait to receive the print data. If in this situation the dedicated driver 22 sends null data or other dummy data to the communication module 25, the dummy data will be sent from the communication module 25 to the POS printer 30, and the waiting state of the communication module 25 or POS printer 30 can be cancelled. After releasing the communication module 25 or POS printer 30 from the wait state, the dedicated driver 22 sends a release request to the communication module 25 to release the printer requested in step S14.

If the communication module 25 or POS printer 30 enters the print data wait state after the communication module 25 or POS printer 30 is occupied, other dedicated applications cannot be executed until the communication module 25 or POS printer 30 is released. Dummy data is therefore sent to cancel the wait state and release the communication module 25 or POS printer 30 so that other dedicated applications can be executed.

Note, further, that the foregoing embodiment is described with the dedicated driver 22 invoked by calling a status information acquisition API 23 or receipt printing API 24, but other APIs may be called.

For example, if a maintenance counter is stored in the POS printer 30, there may be an API for retrieving the maintenance counter values or an API for resetting the maintenance counter, and if a cash drawer is connected to the POS printer 30, there may be an API for opening the drawer. In addition, if the POS printer 30 has an automatic paper cutter, there may be an API for operating the cutter.

Examples of other APIs include an API for determining the presence of sensors, connection of a customer display, or printer specifications such as the firmware version; an API for recovering the POS printer 30 from an error state after the cause of the error is corrected, such as fixing a recoverable error or removing a paper jam; an API for resetting the POS printer 30; an API for running a shutdown process before turning the power off; an API for defining a command definition file for the POS printer 30 or sending a command in the defined command definition file to the POS printer 30; and an API for sending commands to the POS printer 30 or receiving data from the POS printer 30.

Note, further, that the host computer used in the foregoing embodiment of the invention is not limited to a personal computer. A so-called desktop computer is used in the foregoing embodiment, but a notebook computer or a mobile device may be used instead. The interface for connecting the host computer 10 and POS printer 30 is also not limited to a parallel communication interface 19b, and a serial interface, SCSI, USB, or other type of connection interface may be used. The invention can also be used with connection modes not yet developed.

The applications 26, 27, 28 and programs such as the printer driver 20 are stored on a hard disk drive 15 in the foregoing embodiment, but the recording medium used for storage is not so limited. For example, a flexible disk 16a or CD-ROM 17a may be used. Yet further, semiconductor memory devices, optically readable/writable disc media, and magnetically readable/writable disk media may be used. The programs stored on such recording media are read by the host computer 10 using an appropriate drive, such as the flexible disk drive 16 or CD-ROM drive 17, and installed on the hard disk drive 15 or semiconductor memory device. The programs are then executed by the CPU 11 of the host computer 10, for example, from the hard disk drive 15 or semiconductor memory.

Furthermore, the foregoing embodiment describes a 1:1 relationship between the host computer 10 and POS printer 30, but the POS printer 30 may be connected to a plurality of host computers through a network. In this configuration the POS printer 30 can be shared by a plurality of applications running on each of the host computers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A control method for a printer that can operate the printer and, when there is a plurality of applications, can change the application setting the printer to an occupied state based on an occupy request or a release request received from one of the plurality of applications, the occupy request being a request to occupy the printer and the release request being a request to release the printer from being occupied, the control method comprising a step of:

setting the printer to the occupied state based on the application when the occupy request has not been received from the application and a start use request for the printer is received from the application;

wherein, when waiting for print data from the application continues when set to the occupied state, specific dummy data is generated and the wait state is cancelled.

2. The printer control method described in claim 1, wherein:

when the start use request is received from another application while the printer is already occupied by the application, the occupied status is canceled and printer sharing by the plurality of applications is enabled.

3. The printer control method described in claim 1, wherein:

when the occupy request or the release request is received from the application, the printer is set to a shared state.

4. A non-transitory recording medium recording a control program for a printer that can operate the printer and, when there is a plurality of applications, can change the application setting the printer to an occupied state based on an occupy request or a release request received from one of the plurality of applications, the occupy request being a request to occupy the printer and the release request being a request to release the printer from being occupied, the control program comprising:

a step of receiving a start use request for the printer from the application even if the occupy request has not been received from the application; and a step of setting the printer to the occupied state based on the application;

wherein, when waiting for print data from the application continues when set to the occupied state, specific dummy data is generated and the wait state is cancelled.

* * * * *